United States Patent
Chuah et al.

(10) Patent No.: US 8,153,319 B2
(45) Date of Patent: Apr. 10, 2012

(54) SYSTEM AND METHOD FOR PURGING CONDENSATE FROM AN ELECTROCHEMICAL CELL STACK PRIOR TO OPERATION

(75) Inventors: Christopher J. Chuah, Clifton Park, NY (US); Jeffrey W. Schrieber, Troy, NY (US); Thomas V. Doherty, Latham, NY (US); Jun Takeuchi, Tochigi-ken (JP); Akifumi Otaka, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 736 days.

(21) Appl. No.: 12/270,395

(22) Filed: Nov. 13, 2008

(65) Prior Publication Data
US 2009/0123790 A1    May 14, 2009

Related U.S. Application Data

(60) Provisional application No. 61/190,047, filed on Nov. 13, 2007.

(51) Int. Cl.
*H01M 8/04* (2006.01)

(52) U.S. Cl. .................................................. 429/442
(58) Field of Classification Search .......... 429/442–450
See application file for complete search history.

(56) References Cited

U.S. PATENT DOCUMENTS

| 6,673,480 B1 * | 1/2004 | Wilkinson et al. ............ 429/430 |
| 2007/0037025 A1 * | 2/2007 | Venkataraman et al. ....... 429/22 |
| 2008/0152961 A1 * | 6/2008 | Zhou et al. ..................... 429/13 |

* cited by examiner

*Primary Examiner* — Phuong Dinh
(74) *Attorney, Agent, or Firm* — Nelson Mullins Riley & Scarborough LLP; Anthony A. Laurentano (57) ABSTRACT

A system and technique for purging condensate from an electrochemical cell stack prior to operating the stack in one of a power producing mode of operation and an electrochemical pumping mode of operation is provided. The system and technique include storing hydrogen in the anode and cathode chambers of the stack to place the stack in a shutdown state, purging the anode and cathode chambers of condensate prior to starting operation of the stack, and preventing a fuel starvation condition in the stack while purging by sequencing communication of a fuel flow and an oxidant flow to the anode chamber with an oxidant flow to the cathode chamber while purging the condensate.

20 Claims, 7 Drawing Sheets

SYSTEM AND METHOD FOR PURGING CONDENSATE FROM AN ELECTROCHEMICAL CELL STACK PRIOR TO OPERATION

This application claims the benefit under 35 U.S.C. §119(e) to U.S. Provisional Patent Application Ser. No. 61/190,047, entitled, "SYSTEM AND METHOD FOR PURGING CONDENSATE FROM AN ELECTROCHEMICAL CELL STACK PRIOR TO OPERATION," which was filed on Nov. 13, 2007, and is hereby incorporated by reference in its entirety.

BACKGROUND

The invention generally relates to the startup of an electrochemical cell system.

A fuel cell is an electrochemical device that converts chemical energy directly into electrical energy. For example, one type of fuel cell includes a proton exchange membrane (PEM) that permits only protons to pass between an anode and a cathode of the fuel cell. Typically PEM fuel cells employ sulfonic-acid-based ionomers, such as Nafion, and operate in the 50° Celsius (C.) to 75° C. temperature range. Another type employs a phosphoric-acid-based polybenziamidazole, PBI, membrane that operates in the 150° to 200° temperature range. At the anode, diatomic hydrogen (a fuel) is oxidized to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$\text{Anode: } H_2 \rightarrow 2H^+ + 2e^- \quad \text{Equation 1}$$

$$\text{Cathode: } O_2 + 4H^+ + 4e^- \rightarrow 2H_2O \quad \text{Equation 2}$$

The PEM fuel cell is only one type of fuel cell. Other types of fuel cells include direct methanol, alkaline, phosphoric acid, molten carbonate and solid oxide fuel cells.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one cell of the stack. The plates may include various surface flow channels and orifices to, as examples, route the reactants and products through the fuel cell stack. Electrically conductive gas diffusion layers (GDLs) may be located on each side of a catalyzed PEM to form the anode and cathodes of each fuel cell. In this manner, reactant gases from both the anode and cathode flow-fields may diffuse through the GDLs to reach the catalyst layers.

In general, a fuel cell is an electrochemical cell that operates in a forward mode to produce power. In the forward mode, the voltage across the stack has a first polarity. However, the electrochemical cell may be operated in a reverse mode in which the polarity of the voltage across the stack is reversed and the cell produces hydrogen and oxygen from electricity and water. More specifically, an electrolyzer splits water into hydrogen and oxygen with the following reactions occurring at the anode and cathode, respectively:

$$\text{Anode: } 2H_2O \rightarrow O_2 + 4H^+ + 4e^- \quad \text{Equation 3}$$

$$\text{Cathode: } 4H^+ + 4e^- \rightarrow 2H_2 \quad \text{Equation 4}$$

An electrochemical cell may also be operated as an electrochemical pump in the reverse mode. For example, the electrochemical cell may be operated as a hydrogen pump, a device that produces a relatively pure hydrogen flow at a cathode exhaust of the cell relative to an incoming reformate flow that is received at an anode inlet of the cell. In general, when operated as an electrochemical pump, the cell has the same overall topology of the fuel cell. In this regard, similar to a fuel cell an electrochemical cell that operates as a hydrogen pump may contain a PEM, gas diffusion layers (GDLs) and flow plates that establish plenum passageways and flow fields for communicating reactants to the cell. However, unlike the arrangement for the fuel cell, the electrochemical pump cell receives an applied voltage such that the voltage across the stack has a polarity that is reverse of the voltage when operating as a fuel cell, and in response to the received current, hydrogen migrates from the anode chamber of the cell to the cathode chamber of the cell to produce hydrogen gas in the cathode chamber. A hydrogen pump may contain several such cells that are arranged in a stack.

Care must be exercised in shutting down and starting up an electrochemical cell stack to prevent conditions such as thermal combustion, stack membrane damage, and corrosion/oxidation of the stack components, such as carbon corrosion of the anode and cathode electrodes.

SUMMARY

In an embodiment of the invention, a technique to start an electrochemical cell stack includes purging condensate from the stack with a gas flow before operating the stack in one of a power producing mode and an electrochemical pumping mode, and operating the stack in one of the modes after purging the condensate.

In another embodiment of the invention, an electrochemical cell system includes an electrochemical cell stack including an anode chamber and a cathode chamber, and a control subsystem. The control subsystem is configured to start the stack from a shutdown state by controlling an air flow to purge the stack of condensate, and selectively operating the stack in one of a power producing mode and an electrochemical pumping mode after purging the condensate.

In yet another embodiment of the invention, a method to start an electrochemical cell system includes storing hydrogen in an anode chamber and a cathode chamber of an electrochemical cell stack, purging the anode chamber and the cathode chamber of condensate prior to operating the stack in one of a power producing mode and an electrochemical pumping mode, and preventing a fuel starvation condition in the stack while purging the anode chamber and the cathode chamber. The act of preventing the fuel starvation condition includes sequencing communication of a fuel flow and an oxidant flow to the anode chamber with an oxidant flow to the cathode chamber to purge the condensate.

Advantages and other features of the invention will become apparent from the following drawing, description and claims.

DETAILED DESCRIPTION

Figure 1:
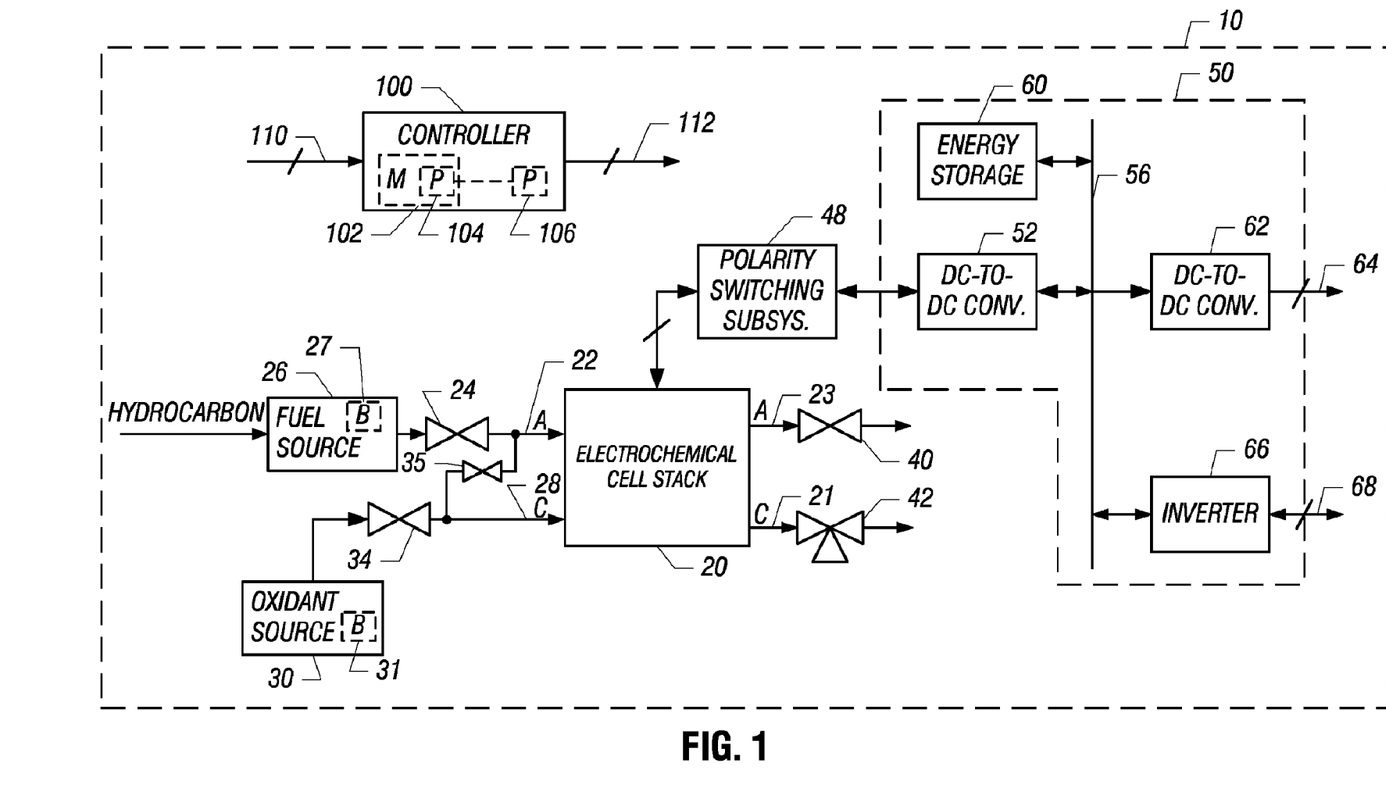
FIG. 1 is a schematic diagram of an electrochemical cell system according to an embodiment of the invention.

Referring to FIG. 1, an electrochemical cell system 10 in accordance with embodiments of the invention includes an electrochemical cell stack 20 (a PEM stack, as an example) that functions in one of two modes: a power producing mode in which the stack 20 produces electrical power; and an electrochemical pumping mode in which the stack 20 operates as an electrochemical pump to purify an incoming fuel flow to produce a purified fuel flow (a hydrogen fuel flow, for example) for storage in a fuel storage system 15. In the power producing mode, the electrochemical cell stack 20 receives an incoming fuel flow at its anode inlet 22, which is communicated to an anode chamber. The "anode chamber" refers to the region of the stack which communicates fuel to the stack, such as the anode flow plate channels and the fuel plenum. The incoming fuel flow may be a reformate flow (50 percent hydrogen, for example), which is furnished by a fuel source 26. As a more specific example, the fuel source 26 may receive an incoming hydrocarbon flow (a liquefied petroleum gas or natural gas flow, as examples), and the fuel source 26 reforms the hydrocarbon flow to produce a fuel flow (i.e., a reformate gas), which is received at the anode inlet 22. In general, the incoming fuel flow flows through the flow channels of the anode chamber of the stack 20 to promote electrochemical reactions pursuant to Eqs. 1 and 2. The anode flow through the stack 20 produces a corresponding anode exhaust flow at an anode outlet 23 of the stack 20. As examples, the anode exhaust may be partially routed back to the anode inlet 22, may be vented to ambient, may be routed to a flare or oxidizer, etc., depending on the particular embodiments of the invention.

The stack 20 also receives an incoming oxidant flow at a cathode inlet 28, which is communicated to a cathode chamber. The "cathode chamber" refers to the region of the stack which communicates oxidant to the stack, such as the cathode flow plate channels and the oxidant plenum. In this regard, an oxidant source 30 (an air compressor or blower, as examples) may furnish an airflow that serves as the oxidant flow to the stack 20. The incoming oxidant flow is routed through the flow channels of the cathode chamber of the stack 20 for purposes of promoting the electrochemical reactions (see Eqs. 1 and 2) inside the stack 20 to produce electrical power. The oxidant flow through the cathode chamber produces a cathode exhaust flow, which appears at a cathode outlet 21 of the stack 20.

As depicted in FIG. 1, the electrochemical cell system 10 may include valves 24 and 34, which are operated by a controller 100 for purposes of controlling the incoming fuel and oxidant flows, respectively, to the fuel cell stack 20. Additionally, the electrochemical cell system 10 may include valves 40 and 42, which are operated by the controller 100 for purposes of controlling the fuel exhaust and oxidant exhaust, respectively, from the stack 20. As further described below, during the transition between the power producing and pumping modes, the controller 100 operates the valves 34 and 42 to isolate the cathode chamber of the stack 20 from any incoming oxidant flow. The controller 100 may likewise operate the valves 24 and 40 for purposes of closing off communication with the anode chamber of the stack 20.

During the electrochemical pumping mode, the controller 100 closes off the valve 34 and opens the valves 24, 40 and 42 for purposes of allowing reformate from the fuel source 26 to flow through the anode chamber of the stack 20. In this mode of operation, the stack 20 receives electrical power and promotes electrochemical reactions to purify the reformate flow to produce hydrogen, which appears at the cathode outlet 21.

The electrochemical cell system 10 includes a power conditioning subsystem 50 that, during the power producing mode of the stack 20, receives the power from the stack 20 and conditions the power into the appropriate form for the loads of the system 10. In this regard, the loads may include auxiliary loads of the electrochemical cell system 10, as well as external loads (residential or commercial AC or DC loads, as examples) and possibly an AC power grid. During the electrochemical cell pumping mode, the power conditioning subsystem 50 provides electrical power to the stack 20. The origin of this electrical power may be the AC power grid, energy that is stored in an energy storage 60 (a battery bank, for example) or another source of power.

In accordance with some embodiments of the invention, the power conditioning subsystem 50 includes a DC-to-DC converter 52, which, during the power producing mode of the stack 20, converts the DC stack voltage into a voltage level for a bus 56. The energy storage 60 is also coupled to the bus 56, and therefore, during the power producing mode of the stack 20, power is transferred via the bus 56 to store energy in the energy storage 60. The power conditioning subsystem 50 may include additional components for purposes of conditioning the power from the bus 56 into the appropriate form for the loads of the system 10. More specifically, the power conditioning subsystem 50 may include another DC-to-DC converter 62, which converts the voltage of the bus 56 into the appropriate voltage or voltages (which appear on output lines 64) to auxiliary and internal loads of the system 10. In some embodiments of the invention, the power conditioning subsystem 50 may include an inverter 66, which converts the DC voltage from the power bus 56 into one or more AC voltages (that appear on terminal 68) for various external auxiliary AC loads and possibly the AC power grid.

For the electrochemical pumping mode, the inverter 66, as an example, may deliver power from the AC grid by communicating an AC signal received at the terminal 68 into the appropriate voltage level for the bus 56. For this mode of operation, the converter 52 communicates power from the bus 56 to the stack 20 by converting the voltage level of the bus 56 into the appropriate DC stack level for promoting the electrochemical cell pumping.

Among the other features of the electrochemical cell system 10, the system 10 may include a polarity switching subsystem 48 for purposes of ensuring the appropriate polarity exists across the stack 20. In this regard, the polarity across the stack 20 is reversed between the power producing and electrochemical pumping modes of the stack 20.

As also shown in FIG. 1, the controller 100 may include a processor 106 (representative of one or more microprocessors and/or microcontrollers), which executes instructions 104 that are stored in a memory 102 for purposes of controlling the various aspects of the system 10. In this regard, the controller 100 may include various output terminals 112 for purposes of regulating operation of the fuel source 26; opening and closing valves (such as the valves 24, 28, 40 and 42, as examples); operating various motors (such as a motor of the oxidant source 30, for example), controlling the power mode to electrochemical pumping mode transition; regulating operation of the converters 52 and 62; regulating operation of the inverter 66; etc., as just a few examples. The controller 100 also includes various input terminals 110 for purposes of monitoring sensed conditions and voltages of the system 10, as well as receiving commands and other information for purposes of controlling operations of the system 10.

It is noted that the system depicted in FIG. 1 is merely for purposes of example, as certain aspects of the system have been simplified for purposes of clarifying the certain aspects of the invention described herein. Furthermore, other variations of the system 10 are contemplated and are within the scope of the appended claims.

Figure 2:
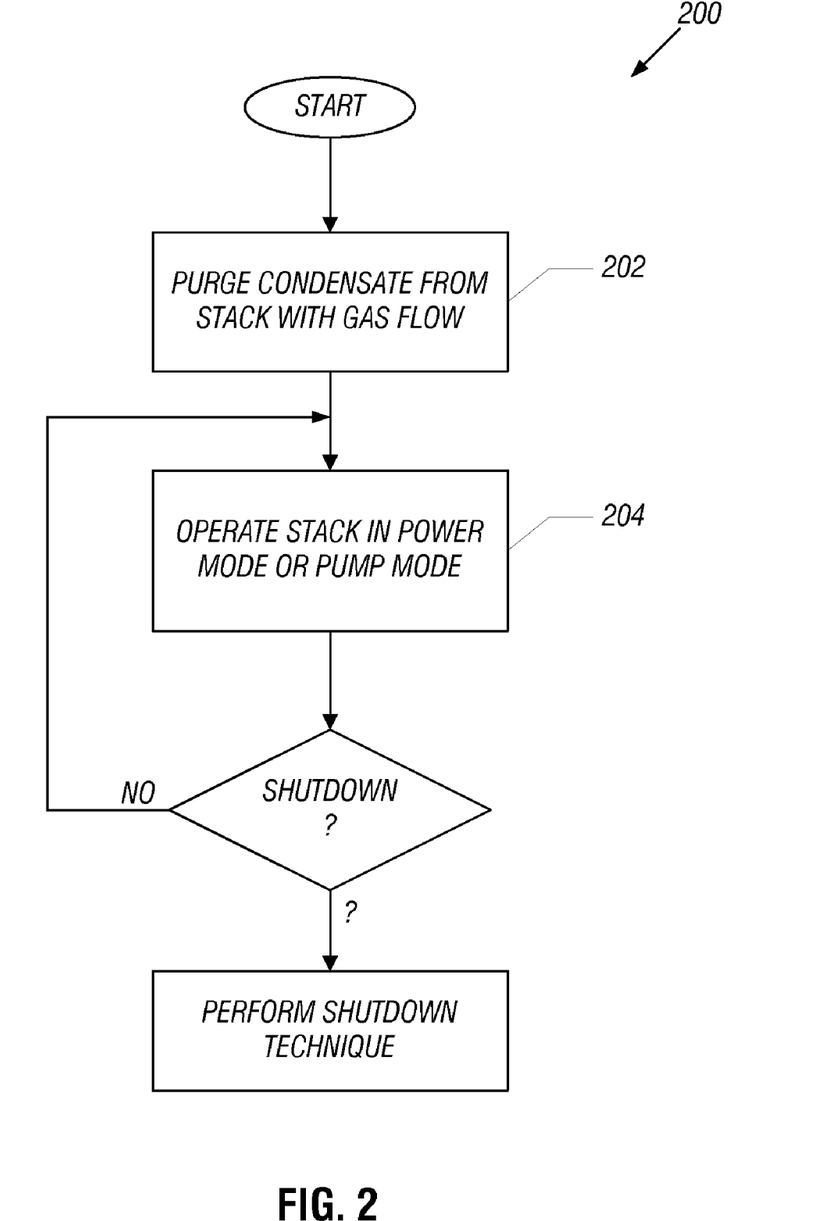
FIG. 2 is a flow diagram of a technique for purging condensate from an electrochemical cell stack in the system of FIG. 1, according to an embodiment of the invention.

Referring to FIG. 2 in conjunction with FIG. 1, in accordance with embodiments of the invention, a technique 200 may be used for purposes of conditioning a stack 20 during startup from a shutdown state. In the shutdown state, electrochemical reactions inside the stack have been halted and various measures may have been taken to protect stack components during the shutdown state (e.g., to prevent corrosion of the components), as well as to ensure that the stack 20 may not be damaged when operation of the stack in either one of the power mode or the pump mode is started up. For instance, the controller 100 may execute various shutdown procedures to store fuel or hydrogen in both the anode and cathode chambers of the stack 20 while in the shutdown state. In some instances, such shutdown procedures may result in the formation of condensate in the stack, such as in either the anode chamber or the cathode chamber. For example, the condensate may result from shutting in the anode chamber and/or the cathode chamber with a gas, such as the reformate gas, which has a high density of water. Condensation of the water in the gas within either the anode chamber or the cathode chamber may result in instability or damage to the stack 20 during startup and/or instability of the stack 20 performance during operation.

To prevent any potential problems that may occur due to the presence of the condensate in the stack 20, the condensate may be purged from the stack 20 prior to startup. One method to rid the stack 20 of the condensate, is to warm the stack 20, for example by using heat generated from the production of reformate, to evaporate the condensate prior to starting up and operating the stack in either the power producing mode or the electrochemical cell pumping mode. However, the time needed to allow the stack 20 to warm up and evaporate the condensate may be considerable, thus requiring a long delay before the stack 20 may be started up after having been placed in a shutdown state. Accordingly, in accordance with the technique 200 illustrated in the flow diagram of FIG. 2, any condensate present in the stack is purged from the stack by communicating a gas flow to the stack having a sufficient flow rate to purge any condensate from the anode and/or cathode chambers (block 202). That is, the gas purge should have a flow rate that is above the critical velocity needed to remove condensate from the flow channels and the gas diffusion layers. This critical velocity may vary depending on the stack configuration and flow channel geometry, and may be, for instance, 0.96 m/s. In one embodiment of the invention, the gas flow may be provided by reformate gas flow provided from the fuel source 26. For instance, additional air may be provided to a burner 27 of the fuel source 26 to provide for a higher flow rate of the reformate gas to the stack 20. In some instances, however, the limitations of the burner 27 may be such that the flow rate of the reformate gas is not sufficient to push the condensate out of the stack 20.

Accordingly, in other embodiments of the invention, the purging gas flow may be provided by the oxidant source 30. The oxidant source 30 may include a blower 31 which may be controlled during startup to adjust the flow of gas (i.e., air) from the oxidant source 30 to the stack 20. Providing the gas flow from the oxidant source 30 instead of from the fuel source 26 to purge the condensate from the stack 20 may be particularly advantageous as the velocity of the air flow provided by the oxidant source may more easily be increased. In addition, the air flow provided by the oxidant source 30 generally is less humid as compared to the reformate flow provided by the fuel source 26. Thus, the oxidant source 30 may be able to provide a higher velocity and drier gas flow than the fuel source 26.

To purge the condensate from the stack 20 during startup, the controller 100 may open valve 34 to communicate the flow of gas from the oxidant source to the cathode chamber of the stack 20. In some embodiments, the system 10 may also include a valve 35 coupled between the anode and cathode inlets 22 and 28, as shown in FIG. 1. In embodiments in which it is desirable to also purge condensate from the anode chamber of the stack 20, the controller 100 also may open the valve 35 to communicate the gas flow from the oxidant source to the anode chamber of the stack 20.

In other embodiments of the invention, the purging gas flow may be provided from the blower which provides air to the burner 27 of the fuel source 26. This source for the purging gas flow may be used in lieu of or in addition to the oxidant source 30. For instance, the oxidant source 30 may be used to purge the condensate from the cathode chamber, while the blower of fuel source 26 may be used to purge the condensate from the anode chamber. Alternatively, either or both of the oxidant source 30 and the blower in fuel source 26 may be used to purge both chambers.

Once the condensate has been purged from the stack 20 by the gas flow, the controller 100 may continue with the startup of the stack 20 in either the power-producing mode or the electrochemical pumping mode (block 204 of FIG. 2). When operating in the power producing mode, the controller 100 opens the valves 24, 34, 40, and 42, and closes valve 35. A fuel flow is communicated to the anode inlet 22 from the fuel source 26 and an oxidant flow is communicated to the cathode inlet 28 from the oxidant source 30 as appropriate to operate the stack 20 in the power-producing mode. If starting in the electrochemical pumping mode, the controller 100 opens valves 24, 40, and 42, and closes valves 34 and 35. A power source, such as the energy storage 60 in the power conditioning subsystem 50, is coupled to the stack 20 through the polarity switching subsystem 48 to provide power to the stack for electrochemical pumping and a fuel flow is provided from the fuel source 26 to the anode inlet 22. When power is no longer demanded from the stack 20 in the power-producing mode or the production is no longer desired in the electrochemical pumping mode (diamond 206), the controller 100 may shut down the system 10 in accordance with a shutdown procedure (block 208), such as the shutdown procedure described in further detail below.

In some embodiments of the invention, it may be desirable to control the purging of the stack 20 in order to either prevent or minimize damage to the stack 20 which may degrade the performance of the stack 20 over time, including shortening the useful operating life of the stack 20. One type of damage that may occur as a result of the purging of condensate with the use of an air flow is carbon corrosion of the anode or cathode components. Carbon corrosion generally results when a first portion of a cell within the stack 20 is starved of fuel and is adjacent to a second portion of a cell within the stack which has fuel in communication with one electrode and oxidant in communication with the other electrode. This results in loss of carbon on the cathode and/or anode electrodes, as shown one or both of by the following chemical reactions:

$$C + 2H_2O \rightarrow CO_2 + 4H^+ + 4e^- \qquad \text{Equation 5}$$

$$C + H_2O \rightarrow CO + 2H^+ + 2e^- \qquad \text{Equation 6}$$

Accordingly, to prevent fuel starvation and the resultant carbon corrosion, according to one embodiment of the invention, the stack 20 is started from a shutdown state in which the anode and cathode chambers have been enclosed with hydrogen (e.g., reformate, purified hydrogen, etc.). Enclosing the chambers with hydrogen may be accomplished either during shutdown of the system or prior to initiating the purging sequence which will be described below.

Figure 3:
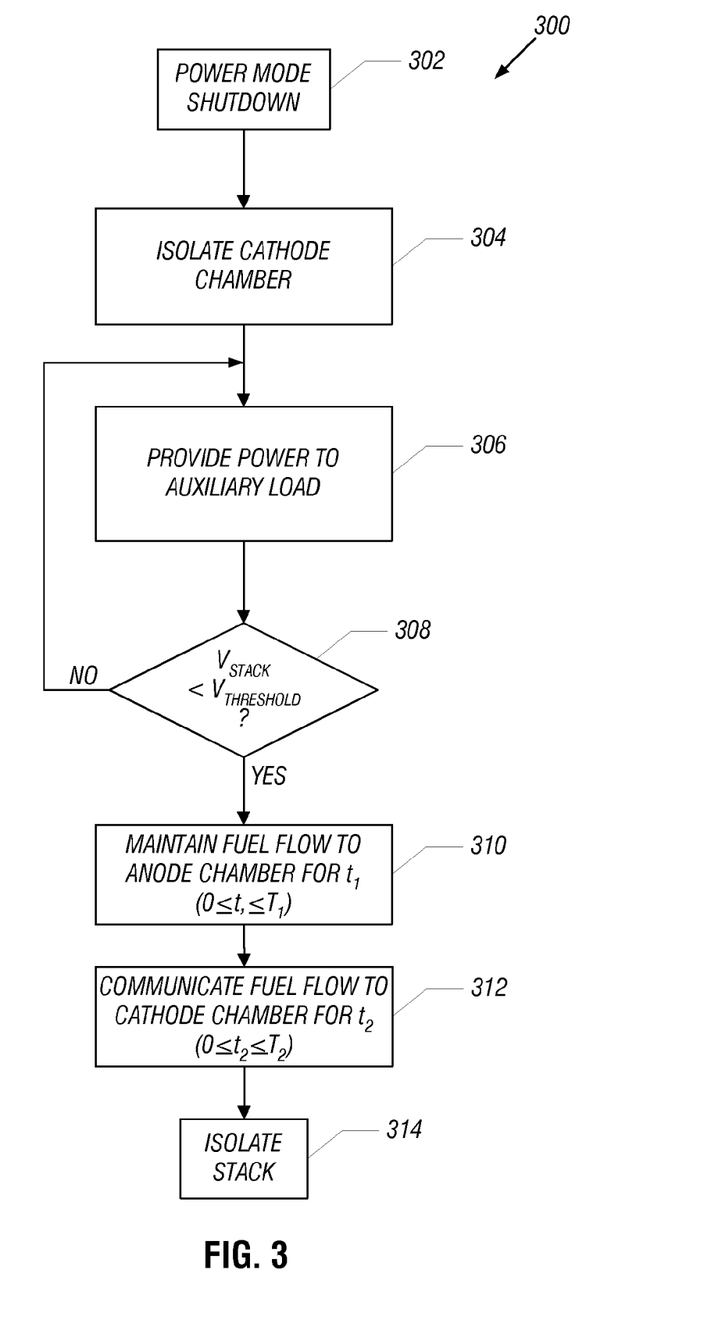
FIG. 3 is a flow diagram of a technique for placing the system of FIG. 1 in a shutdown condition prior to purging the condensate using the technique of FIG. 2, according to an embodiment of the invention.

For instance, with reference to the technique 300 illustrated in FIG. 3, if the system 10 has been operating in a power producing mode, once the demand for power has ceased (block 302), the controller 100 may initiate a shutdown sequence that includes closing valve 34 to terminate the supply of air to the cathode inlet 28 from the oxidant source 30 and closing valve 42 to prevent back diffusion of air into the cathode exhaust port 21, thus isolating the cathode chamber and trapping oxidant therein (block 304). The stack 20 then may be kept running at a predetermined auxiliary load, such as the fuel cell system 10 itself, recharging the energy storage 60, or a dummy load (block 306). Continuing to produce power from the stack 20 eventually consumes the oxidant trapped in the cathode chamber, and the stack voltage will drop to a low level (e.g., 0-0.06V PROVIDE A RANGE). Once the stack voltage drops below a predefined threshold (e.g., 0.06V) (diamond 308), the controller 100 may maintain fuel flow to the anode chamber through inlet 22 for a time period, $t_1$, (e.g., 0-10 minutes) (block 310) and then open valve 35 to communicate a fuel flow to the cathode chamber through inlet 28 for a time period, $t_2$ (e.g., 0-5 minutes) (block 312). To the extent that the valves 24, 34, 35, 40 and 42 are not already closed, the controller 100 may then completely isolate the stack 20 by closing the valves 24, 34, 35, 40 and 42 to shut off the stack's inlet ports 22 and 28 and outlet ports 21 and 23, thus storing fuel (i.e., hydrogen) in both the cathode and anode chambers (block 314). In embodiments in which fuel is not communicated to the cathode chamber (i.e., if a time period of 0 minutes is used), the cathode chamber will fill with hydrogen as a result of the natural diffusion of hydrogen from the anode chamber to the cathode chamber through the stack's membrane.

Figure 4:
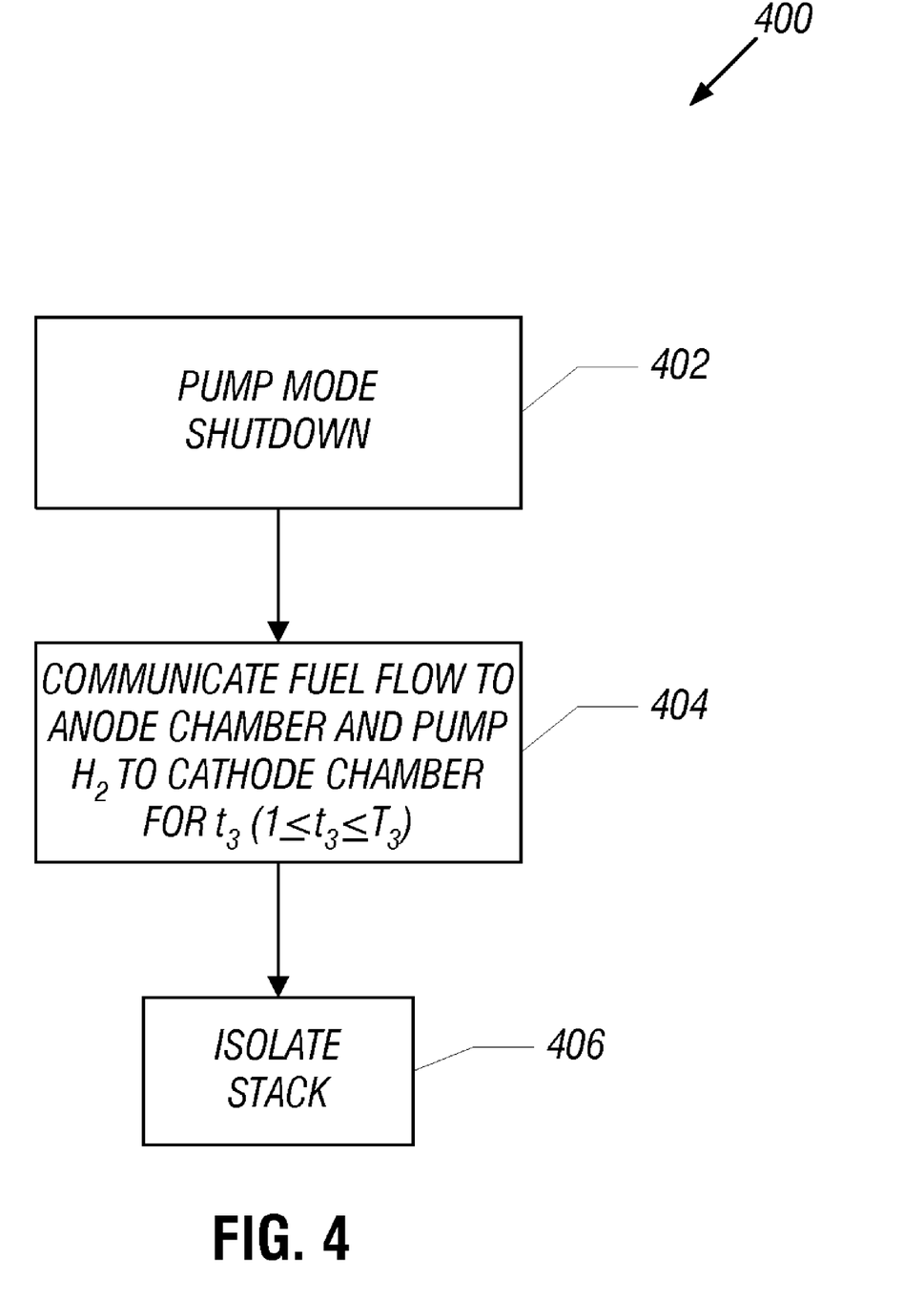
FIG. 4 is a flow diagram of another technique for placing the system of FIG. 2 in a shutdown condition prior to purging the condensate, according to an embodiment of the invention.

With reference to the shutdown technique 400 illustrated in FIG. 4, in embodiments in which the stack 20 has been operating in the electrochemical pumping mode prior to shutdown (block 402), hydrogen may be stored in the anode and cathode chambers by simply continuing to pump hydrogen to the cathode for a time period, $t_3$ (e.g., 1-10 minutes), after the demand for hydrogen production has ceased by continuing the communication of the fuel flow to the anode chamber and the application of the pumping power supply (e.g., energy storage 60, the AC grid through inverter 66 and bus 56, etc.) (block 404). After the time period, $t_3$, has expired, the controller 100 isolates the stack 20 by closing valves 24, 34, 35, 40 and 42 to the extent that such valves are not already closed (block 406). As a result, the stack 20 will be in a shutdown state in which hydrogen is stored in the anode and cathode chambers.

While the stack 20 is in the shutdown state, condensate may form in either or both the anode and cathode chambers due to the enclosed reformate, which generally has some degree of water content. To avoid a failure, damage or instable operation of the stack 20 upon startup into either the power producing mode or the pump mode, the condensate may be purged from the stack 20 using a gas flow, and preferably an oxidant flow from oxidant source 30, prior to operation as discussed above. The sequence with which the introduction of oxidant into the anode and cathode chambers takes place may create conditions in which portions of the stack 20 are starved of fuel. Because fuel starvation may lead to carbon corrosion on the cathode and anode electrodes and, thus, limit the useful life of the stack 20, it may be desirable to prevent the occurrence of a fuel starvation condition.

Figure 5:
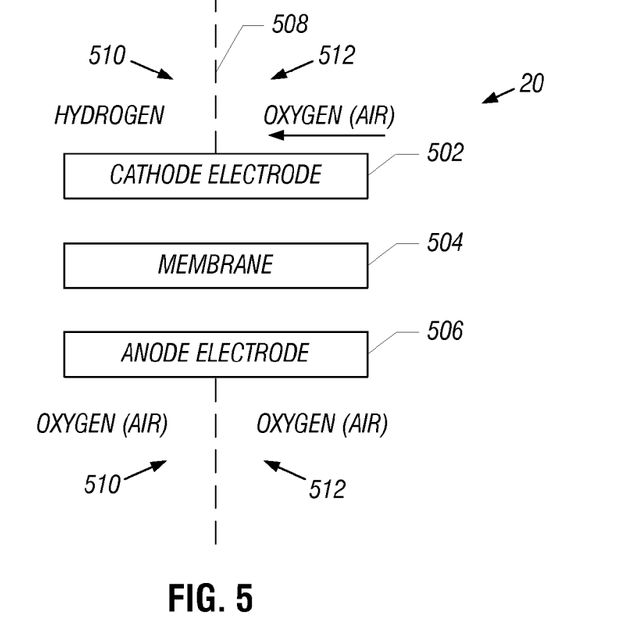
FIG. 5 is a diagram illustrating the presence of a fuel starvation condition that may occur while purging the condensate from the stack of FIG. 1, in accordance with an embodiment of the invention.
Figure 6:
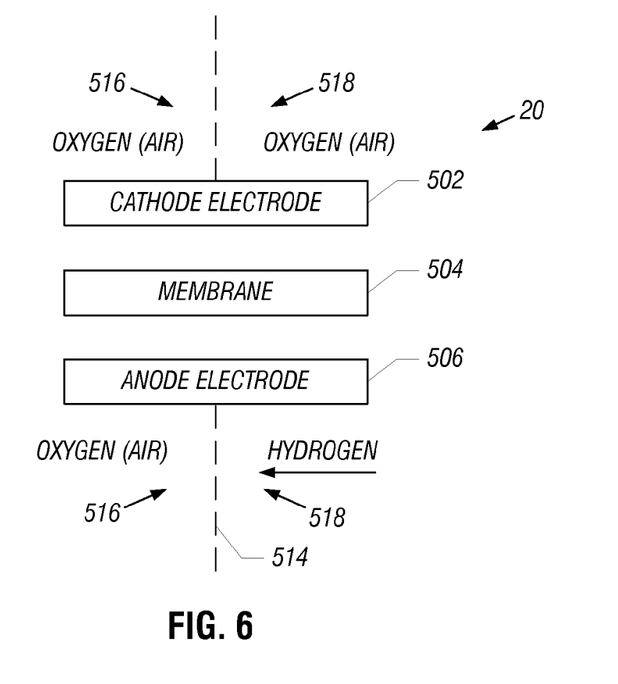
FIG. 6 is a diagram illustrating the presence of another fuel starvation condition that may occur while purging the condensate from the stack of FIG. 1, in accordance with an embodiment of the invention.

Examples of conditions which may result in fuel starvation and carbon corrosion are shown in FIGS. 5 and 6, each of which illustrates a cathode electrode 502, a membrane 504 and an anode electrode 506 of the stack 20. In FIG. 5, the stack 20 is in an initial condition in which hydrogen is present in the cathode chamber and an oxidant is present in the anode chamber. This initial condition may be present, for example, if hydrogen has been stored in the anode and cathode chambers and an air flow has been introduced into the anode chamber to purge condensate, for example. If an air flow then is communicated to the cathode chamber to purge condensate, for example, then a front 508 is created in which air is pushing the hydrogen already present in the cathode chamber. On side 510 of the front 508, the presence of hydrogen on the cathode and air on the anode allows for power production through the natural electrochemical reactions set forth in Eqs. 1 and 2. However, on side 512 of the front 508, a fuel starvation condition has been created because air is present on both sides of the membrane 504 in this region of the stack 20. Accordingly, as shown by Eqs. 5 and 6, carbon corrosion on the anode electrode 506 may result. This carbon corrosion is powered by the condition on the side 510 of the front 508 (i.e., hydrogen on the cathode and oxidant on the anode) that allows for power production.

FIG. 6 shows a similar situation in which a fuel starvation condition may result in carbon corrosion on the cathode electrode 502. In FIG. 6, a fuel flow is communicated to the anode chamber after the anode chamber and the cathode chamber have each been purged by an air flow, creating a front 514 in which hydrogen is pushing oxygen. Here, power is produced on side 518 of the front 514, while fuel starvation occurs in the region of the stack 20 on side 516 of the front 514. This condition results in carbon corrosion on the cathode electrode 502 in accordance with Eqs. 5 and 6.

Accordingly, in some embodiments of the invention, the oxidant flow and fuel flow are communicated to the anode and cathode chambers in a sequence that substantially prevents or minimizes fuel starvation and thus carbon corrosion. More particularly, as shown in FIG. 7 and the flow diagram of FIG.

Figure 7:
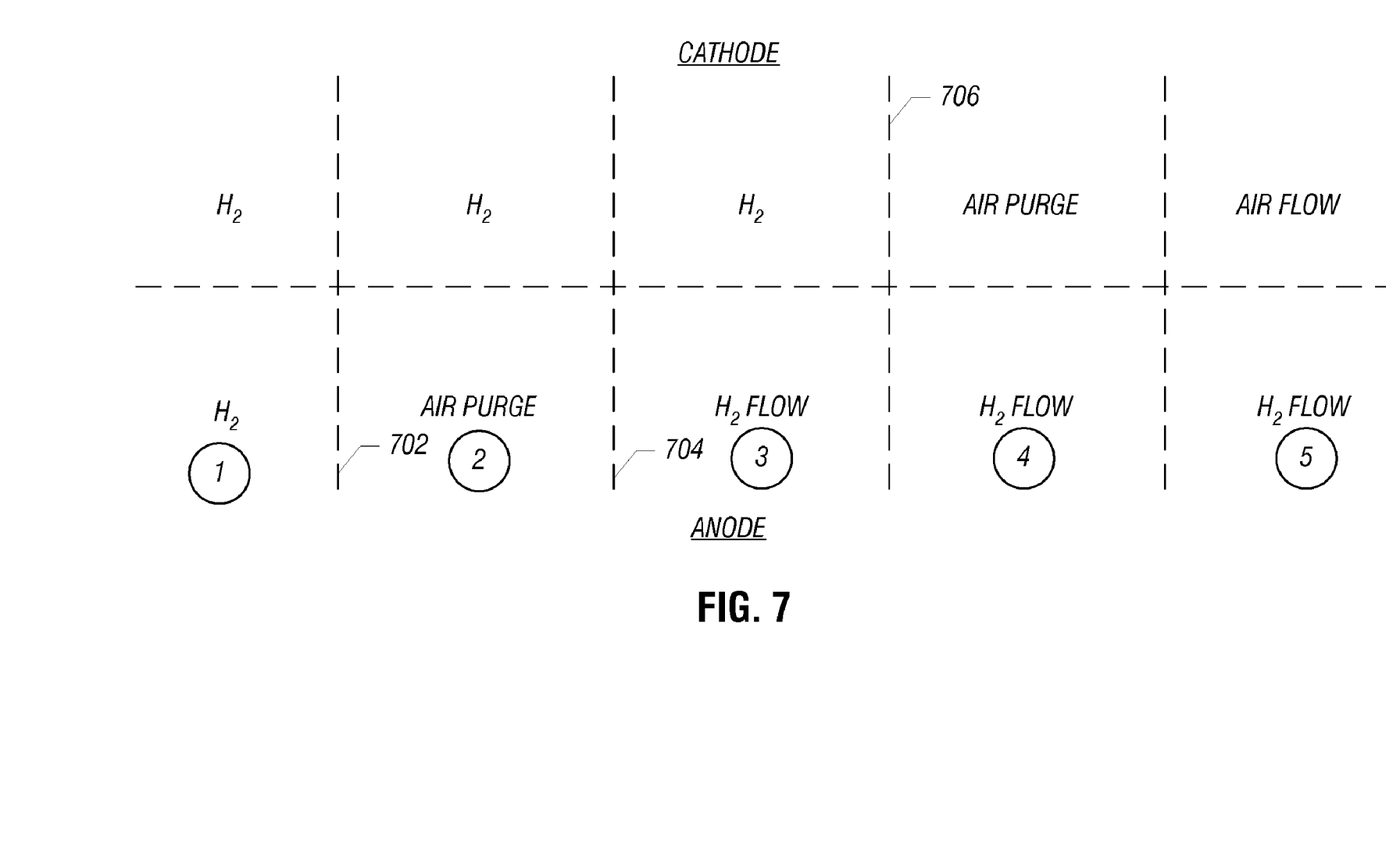
FIG. 7 is a diagram representing conditions in the stack while implementing the technique of FIG. 8, in accordance with an embodiment of the invention.
Figure 8:
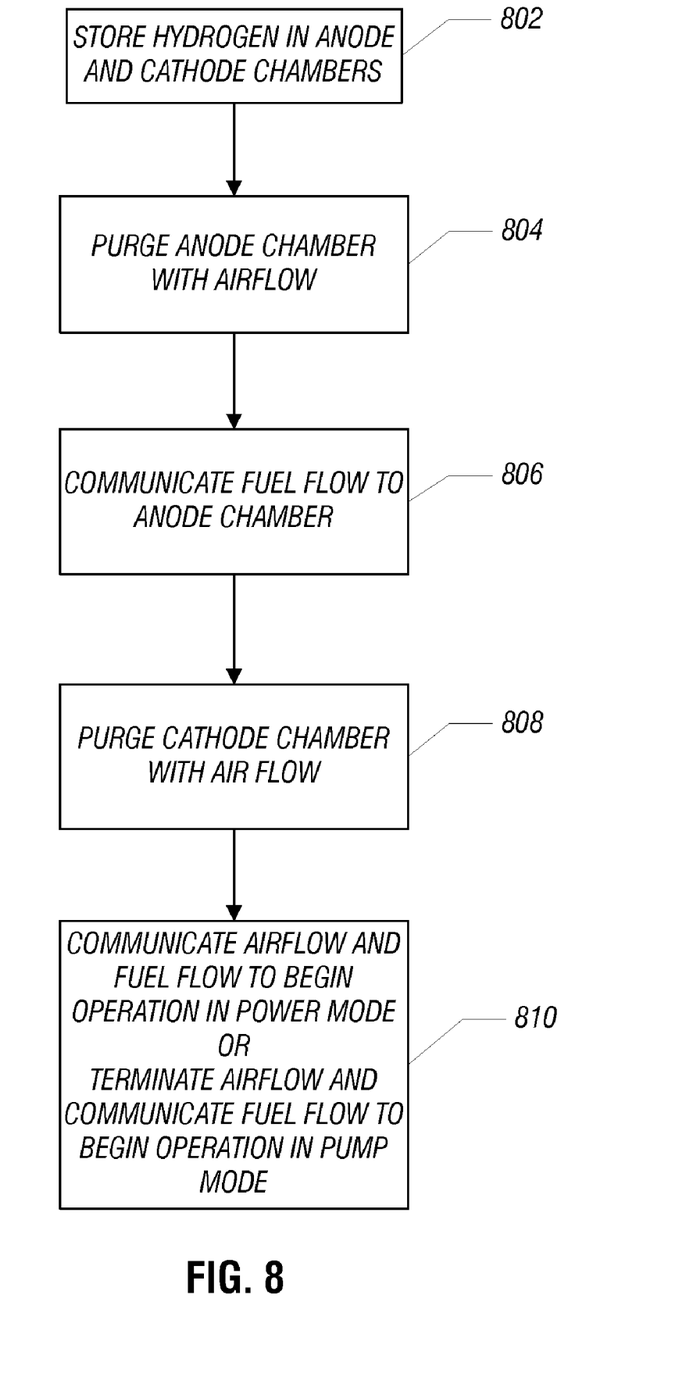
FIG. 8 is a flow diagram of a technique for preventing a fuel starvation condition while purging condensate from the stack pursuant to the technique of FIG. 2, in accordance with an embodiment of the invention.

8, the stack 20 is started from a shutdown condition in which hydrogen has been stored in both the anode and cathode chambers (step 1 in FIG. 7; block 802 in FIG. 8). Condensate in the anode chamber is first purged with an air flow provided by the oxidant source 30 at a flow rate sufficient to purge the condensate from the flow channels and the gas diffusion layers for example (step 2 in FIG. 7; block 804 in FIG. 8). The air purge creates a front 702 in which air is pushing hydrogen on the anode. Front 702 does not create a fuel starvation condition because hydrogen is on both the anode and the cathode in one region of the stack 20, while hydrogen and air are on the cathode and anode, respectively, in the other region of the stack 20.

A fuel flow from the fuel source 26 is then communicated to the anode chamber, which creates a front 704 that does not result in fuel starvation in a portion of the stack 20 (step 3 in FIG. 7; block 806 in FIG. 8). More specifically, at this stage in the sequence, the region of the stack 20 on one side of the front 704 has hydrogen on the cathode and air on the anode, while the region of the stack 20 on the other side of the front 704 has hydrogen on both the anode and cathode. The cathode chamber may then be purged with an air flow, creating a front 706 that once again does not result in fuel starvation in any region of the stack 20 (step 4 in FIG. 7; block 808 in FIG. 8). More particularly, as shown in FIG. 7, the region of the stack 20 on one side of the front 706 has hydrogen on both the anode and cathode, while the region of the stack 20 on the other side of the front 706 has air on the cathode and hydrogen on the anode. Finally, after the condensate has been purged from both the anode and cathode chambers in the sequence described above, an air flow and fuel flow may be communicated to the cathode inlet 28 and anode inlet 22, respectively, to operate the stack 20 in a power producing mode (step 5 in FIG. 7; block 810 in FIG. 8). Alternatively, in embodiments in which operation in the pumping mode is desired, the air flow to the cathode inlet 28 is terminated and the fuel flow is communicated to the anode inlet 22.

It should be understood that the above-described sequence is intended as only one example of a sequence of air and fuel flows which prevents fuel starvation and resulting carbon corrosion in any region of the stack 20 during a startup sequence that includes the purging of condensate by use of an air flow. Other sequences of air flow and fuel flow also are contemplated which may vary depending on the manner in which the stack 20 has been shut down. For instance, a sequence that started with hydrogen on both the anode and cathode electrodes, followed by an air purge on the cathode, would not create a fuel starved condition. In such a case, the oxidant/hydrogen front created by the purge would push hydrogen on the cathode. However, since hydrogen was present on both the anode and cathode electrode prior to the air purge, no fuel starvation condition is created. At this point in the sequence, air is present on the cathode and fuel is present on the anode. Accordingly, the flow of fuel to the anode and oxidant to the cathode to begin operation of the stack in the power mode may be initiated without risk of damage to the stack 20. Alternatively, a fuel purge can be utilized on the anode electrode prior to the normal operation fuel flow, and since fuel is already present on the electrode no damaging front will be created during this purge.

Sequences of air and fuel flows to the cathode and anode also are envisioned which may result in some degree of fuel starvation but which do not substantially detract from the useful life of the stack 20. For instance, a sequence in which the stack 20 starts in a condition in which hydrogen is present on both the anode and cathode electrodes may proceed with an air purge that is communicated to the anode and cathode substantially simultaneously. In such an embodiment, the space velocity of each of the air and fuel flows may be controlled such that the space velocity is substantially the same for both flows, resulting in the fuel/oxidant front on each of the cathode and anode to travel at approximately the same speed through the flow plates of the stack 20. In embodiments in which the anode and cathode flow plates are mirror images of each other, then the fuel/oxidant fronts on either side of the stack membrane may be substantially aligned as the fronts progress through the stack. Thus, to the extent that the fronts remain aligned, carbon corrosion may be prevented. In yet other embodiments, the stack geometry may not be such that the cathode and anode flow fields are mirror images. In such embodiments, the flow rates of the cathode and anode air purges may be controlled in a manner that takes into account the different geometries, yet still achieves the objective of aligning the fronts relative to each other such that carbon corrosion is prevented or minimized.

In some embodiments, certain conditions present in the stack 20 may prevent the fronts from remaining aligned. For instance, condensate in the chambers may slow the progress of the fronts as the fronts encounter the condensate. Because condensate may be present in differing amounts in each of the chambers, the fronts may travel at slightly different speeds. In addition, manufacturing variations which result in differences between the flow plates of the anode and cathode chambers also may result in the fronts traveling at different speeds through the stack. In either case, however, the misalignment is between the fronts slight, such that only a small power producing region will be created in the stack. Because power is proportional to current and current is proportional to electrode area, the slight misalignment between the fronts will result in a minimal amount of carbon corrosion as compared to the damage that would otherwise occur if the space velocity of the flows were not controlled.

The communication of the fuel flow to the stack 20 after the air purge also may be performed substantially simultaneously to the anode and cathode. In such a case, fuel will push oxidant on both the anode and cathode, and the nature of the front (i.e., fuel/oxidant) is the same as for a simultaneous air purge. Thus, controlling the simultaneous fuel flows to the anode and cathode in a manner that ensures that the resulting fronts remaining substantially aligned across the stack membrane as the fronts progress through the stack also may minimize the area of the power producing region of the fronts and, thus, the resulting carbon corrosion.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method to start an electrochemical cell stack having an anode chamber and a cathode chamber, comprising:
    purging condensate from the stack with a gas flow before operating the stack in one of a power producing mode and a electrochemical pumping mode; and
    operating the stack in the one of the powering producing mode and the electrochemical pumping mode after the purging of the condensate,
    wherein operating the stack in the power producing mode comprises:
        providing a fuel flow to the anode chamber, and
        providing an oxidant flow to the cathode chamber;
    wherein operating the stack in the electrochemical pumping mode comprises:

providing power to the stack from a power source coupled to the stack through a polarity switching subsystem, and providing the fuel flow to the anode chamber;

wherein the polarity switching subsystem switches between the electrochemical pumping mode and the power producing mode.

2. The method as recited in claim 1, wherein purging the condensate comprises purging the anode chamber of the stack with the gas flow.

3. The method as recited in claim 2, wherein purging the condensate comprises purging the cathode chamber of the stack with the gas flow after purging the anode chamber.

4. The method as recited in claim 1, comprising providing the oxidant flow from an oxidant source coupled to the stack.

5. The method as recited in claim 4, wherein operating the stack in the power producing mode further comprises:

isolating the anode chamber from the oxidant source;

coupling the oxidant source to the cathode chamber to provide the oxidant flow to the stack; and coupling a fuel source to the anode chamber to provide the fuel flow to the stack.

6. The method as recited in claim 4, wherein operating the stack in the electrochemical pumping mode further comprises:

isolating the oxidant source from the anode chamber and the cathode chamber; and coupling a fuel source to the anode chamber to provide the fuel flow to the stack.

7. The method as recited in claim 1, comprising:

placing the stack in a shutdown state prior to the purging, wherein the act of placing comprises:

storing hydrogen in the cathode chamber and the anode chamber.

8. An electrochemical cell system, comprising:

an electrochemical cell stack including an anode chamber and a cathode chamber; and a control subsystem configured to:

start the stack from a shutdown state by controlling an air flow to purge the stack of condensate formed while in the shutdown state; and selectively operating the stack in one of a power producing mode and an electrochemical pumping mode after purging the condensate, wherein operating the stack in the power producing mode comprises:

providing a fuel flow to the anode chamber, and providing an oxidant flow to the cathode chamber;

wherein operating the stack in the electrochemical pumping mode comprises:

providing power to the stack from a power source coupled to the stack through a polarity switching subsystem, and providing the fuel flow to the anode chamber;

wherein the polarity switching subsystem switches between the electrochemical pumping mode and the power producing mode.

9. The system as recited in claim 8, wherein the control subsystem is configured to purge the condensate in the anode chamber of the stack with the air flow.

10. The system as recited in claim 9, wherein the control subsystem is configured to purge the condensate in the cathode chamber of the stack with the air flow after purging the anode chamber with the air flow.

11. The system as recited in claim 8, further comprising an oxidant source selectively coupled to the stack to provide the air flow to purge the condensate.

12. The system as recited in claim 8, wherein the control subsystem is configured to place the stack in the shutdown state by storing hydrogen in the cathode chamber and the anode chamber and isolating the stack from the fuel flow and the oxidant flow.

13. The system as recited in claim 8, wherein the control subsystem is configured to prevent carbon corrosion in the stack during purging by communicating the oxidant flow and the fuel flow to the anode chamber and an oxidant flow to the cathode chamber in a predefined sequence.

14. The system as recited in claim 13, wherein the predefined sequence comprises:

storing hydrogen in the cathode chamber and the anode chamber;

purging the anode chamber of condensate with the oxidant flow;

communicating the fuel flow to the anode chamber after purging the anode chamber; and purging the cathode chamber of condensate with the oxidant flow after communicating the fuel flow to the anode chamber.

15. A method to start up an electrochemical cell system having an electrochemical cell stack, comprising:

storing hydrogen in an anode chamber and a cathode chamber of the stack;

purging the anode chamber and the cathode chamber of condensate prior to starting operation of the stack in one of a power producing mode and an electrochemical pumping mode; and preventing a carbon corrosion condition in the stack while purging the anode chamber and the cathode chamber of condensate, the act of preventing comprising:

sequencing communication of a gas flow to the anode chamber with a gas flow to the cathode chamber to purge the condensate from the anode chamber and the cathode chamber, wherein operating the stack in the power producing mode comprises:

providing a fuel flow to the anode chamber, and providing an oxidant flow to the cathode chamber;

wherein operating the stack in the electrochemical pumping mode comprises:

providing power to the stack from a power source coupled to the stack through a polarity switching subsystem, and providing the fuel flow to the anode chamber;

wherein the polarity switching subsystem switches between the electrochemical pumping mode and the power producing mode.

16. The method as recited in claim 15, wherein the act of sequencing comprises:

purging the condensate from the anode chamber with a gas flow prior to purging the condensate from the cathode chamber with a gas flow.

17. The method as recited in claim 16, wherein the act of sequencing further comprises communicating the fuel flow to the anode chamber after purging the anode chamber and prior to purging the cathode chamber.

18. The method as recited in claim 15, wherein the act of sequencing comprises communicating a gas flow to the anode chamber substantially simultaneously with communicating a gas flow to the cathode chamber.

19. The method as recited in claim 18, further comprising controlling each gas flow such that progression of a first front through the anode chamber relative to progression of a second front through the cathode chamber substantially prevents the carbon corrosion condition.

20. The method as recited in claim 19, wherein the act of controlling comprises controlling each gas flow such that the progression of the first front is substantially aligned with the progression of the second front one either side of a membrane between the anode chamber and the cathode chamber.

* * * * *